US009623562B1

(12) United States Patent
Watts

(10) Patent No.: US 9,623,562 B1
(45) Date of Patent: Apr. 18, 2017

(54) ADJUSTING ROBOT SAFETY LIMITS BASED ON NETWORK CONNECTIVITY

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/683,665

(22) Filed: Apr. 10, 2015

(51) Int. Cl.
| B25J 9/16 | (2006.01) |
| H04L 29/08 | (2006.01) |
| H04W 36/30 | (2009.01) |
| H04W 72/08 | (2009.01) |
| G05D 1/00 | (2006.01) |
| H04W 40/12 | (2009.01) |

(52) U.S. Cl.
CPC ............ *B25J 9/1689* (2013.01); *H04L 67/10* (2013.01); *H04L 67/36* (2013.01); *H04W 36/30* (2013.01); *G05B 2219/40184* (2013.01); *G05D 1/0022* (2013.01); *G05D 1/0027* (2013.01); *H04L 67/125* (2013.01); *H04W 40/12* (2013.01); *H04W 72/085* (2013.01)

(58) Field of Classification Search
CPC ... G05D 1/0027; G05D 1/0022; H04W 36/30; H04W 72/085; H04W 40/12; H04L 1/0001; H04L 1/0018; H04L 67/125; H04L 67/36; H04L 67/10; Y10S 901/01; B25J 9/1689; G05B 2219/40184
See application file for complete search history.

(56) References Cited

U.S. PATENT DOCUMENTS

| 6,374,155 B1 * | 4/2002 | Wallach | G05D 1/0274 700/245 |
| 7,970,493 B2 * | 6/2011 | Kim | E02B 15/04 700/23 |
| 8,897,152 B1 * | 11/2014 | Caceres | H04W 36/30 370/252 |

(Continued)

OTHER PUBLICATIONS

"Maintaining network connectivity and performance in robot teams", Hsieh et al., Journal of Field Robotics, vol. 25, Issue 1-2, Jan. 2008, pp. 111-131.

*Primary Examiner* — Jason Holloway
(74) *Attorney, Agent, or Firm* — McDonnell Boehnen Hulbert & Berghoff LLP

(57) ABSTRACT

Example systems and methods are disclosed for limiting capabilities of a robot during teleoperation based on a network connection strength. The method may include determining tiers of operations that can be performed by a robot. One or more network strength thresholds corresponding to one or more of the tiers of operations of the robot may also be determined. The robot may then measure the network strength for the communication network between the robot and a remote control system. Based on the measured network strength and the determined network strength thresholds, one or more of the tiers of operations may be enabled for selection by the remote control system. The robot may determine network strength based on network latency and/or packet loss rate. The robot may provide a notification to the remote control system about the disabling of a previously enabled tier of operations due to decreased network strength.

20 Claims, 10 Drawing Sheets

(56) References Cited

U.S. PATENT DOCUMENTS

| | | | |
|---|---|---|---|
| 9,137,727 B2 * | 9/2015 | Kulkarni | H04W 36/30 |
| 9,148,908 B2 * | 9/2015 | Bhargava | H04W 72/085 |
| 9,216,508 B2 * | 12/2015 | Ruuspakka | B25J 9/1664 |
| 2007/0063834 A1 * | 3/2007 | Bozzone | A63H 30/04 |
| | | | 340/539.1 |
| 2008/0082210 A1 * | 4/2008 | Kim | E02B 15/04 |
| | | | 700/255 |
| 2013/0101002 A1 | 4/2013 | Gettings et al. | |
| 2013/0117867 A1 | 5/2013 | Fung | |
| 2013/0338853 A1 * | 12/2013 | Hsu | G05D 1/028 |
| | | | 701/2 |
| 2015/0197010 A1 * | 7/2015 | Ruuspakka | B25J 9/1664 |
| | | | 700/245 |

* cited by examiner

| TIERS | OPERATIONS | NETWORK LATENCY | PACKET LOSS RATE |
|---|---|---|---|
| 1 | Robot Arm Control | < 50 ms | < 1% |
| 2 | Manual Navigation Control | < 100 ms | < 2% |
| 3 | Destination-Based Navigation Control | < 250 ms | < 5% |
| 4 | Gathering Sensor Data | < 1 s | < 10% |

ADJUSTING ROBOT SAFETY LIMITS BASED ON NETWORK CONNECTIVITY

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may provide for adjusting robot teleoperation capabilities based on network strength. In particular, example systems and methods may limit capabilities of a robot that can be selected by a remote operator based on a network connection strength between the robot and the remote operator in an environment (e.g., a warehouse). The system may limit robot capabilities based on precision, riskiness, and/or network sensitivity. For instance, disabled robot capabilities for a given network connection may include high precision robot arm control and robot walking control. Enabled robot capabilities may include navigation and gathering sensor data. Network strength may be measured based on network latency or a packet loss rate. The network strength may be measured at the robot based on a cumulative round-trip time for a data transmission. The system may allow human operator overrides and/or failsafe operation modes for capabilities disabled due to low network strength. The system may also provide a user interface to a human operator indicating network strength and robot capability availability. Further, the system may notify the user when a capability is disabled due to a decreased network strength.

In one example, a method is provided that includes determining, for a robot, a plurality of tiers of operations that can be performed by the robot. The method may also include determining a plurality of network strength thresholds, where each network strength threshold corresponds to one of the plurality of tiers of operations of the robot. The method may additionally include measuring a network strength for a network used by the robot to receive commands from a remote control system to execute one or more of the operations. The method may also include enabling one or more of the plurality of tiers of operations for selection by the remote control system, where the one or more enabled tiers have a corresponding network strength threshold less than or equal to the measured network strength.

In an additional example, a non-transitory computer readable medium is provided that stores instructions that are executable by one or more computing devices associated with a robot. When the instructions are executed, the instructions cause the one or more computing devices to perform functions that include determining, for a robot, a plurality of tiers of operations that can be performed by the robot. The functions may also include determining a plurality of network strength thresholds, wherein each network strength threshold corresponds to one of the plurality of tiers of operations of the robot. The functions may also include measuring a network strength for a network used by the robot to receive commands from a remote control system to execute one or more of the operations. The functions may also include enabling one or more of the plurality of tiers of operations for selection by the remote control system, where the one or more enabled tiers have a corresponding network strength threshold less than or equal to the measured network strength.

In another example, a robot is disclosed that includes a processor and a memory that stores instructions that are executed by the processor. When executed, the instructions cause the robot to perform functions that include determining, for the robot, a plurality of tiers of operations that can be performed by the robot. The functions may also include determining a plurality of network strength thresholds, wherein each network strength threshold corresponds to one of the plurality of tiers of operations of the robot. The functions may also include measuring a network strength for a network used by the robot to receive commands from a remote control system to execute one or more of the operations. The functions may also include enabling one or more of the plurality of tiers of operations for selection by the remote control system, where the one or more enabled tiers have a corresponding network strength threshold less than or equal to the measured network strength.

In a further example, a system may include means for determining, for a robot, a plurality of tiers of operations that can be performed by the robot. The system may also include means for determining a plurality of network strength thresholds, where each network strength threshold corresponds to one of the plurality of tiers of operations of the robot. The system may additionally include means for measuring a network strength for a network used by the robot to receive commands from a remote control system to execute one or more of the operations. The system may also include means for enabling one or more of the plurality of tiers of operations for selection by the remote control system, where the one or more enabled tiers have a corresponding network strength threshold less than or equal to the measured network strength.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
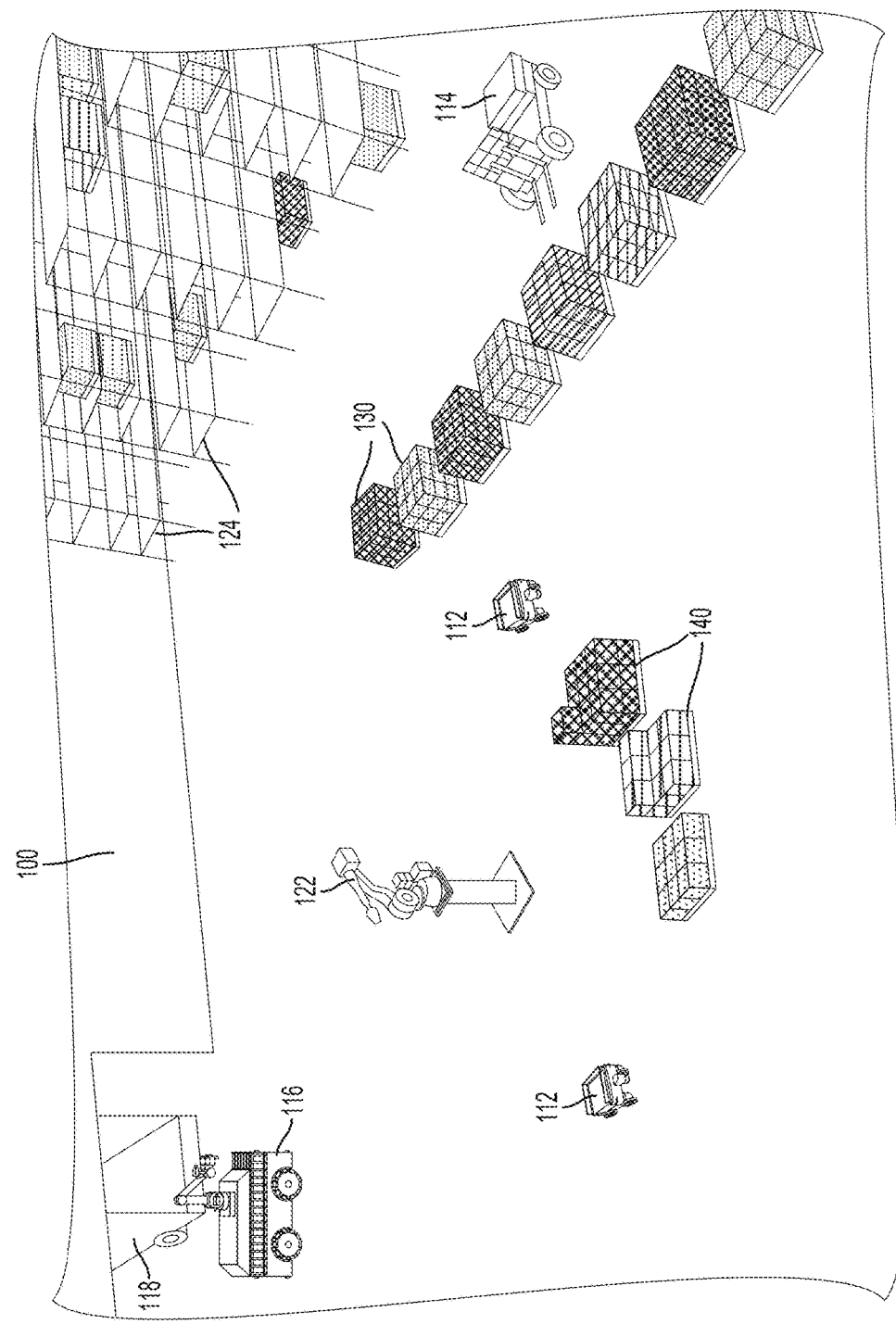
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Robotic teleoperation (remote control of a robot) over a low bandwidth and/or high latency network connection can present robot control problems. In particular, human operators may have to control a robot based on missing data, such as delayed sensor data, missing camera data, and/or missing feedback data, due to a poor network connection. Furthermore, control inputs from a human operator for a robot may be delayed. The combined delay of sensor and control signals may cause human operators to be unable to control robots to react to changes in the robot's environment (e.g., a warehouse).

One way to prevent these safety problems is to limit a robot's capabilities for remote execution based on the network connection strength of the data communication network for the robot. In particular, robot capabilities that are high precision, high-risk, and/or network sensitive may be enabled when the network connection strength is at a high level. For example, robot arm control is a high precision capability that may be disabled if the network connection strength is not at a high level.

Alternatively, robot capabilities that are not network sensitive or require little precision may be enabled regardless of the network strength. Additionally, robot capabilities that are low risk may also be enabled despite a low network strength. For example, a robot can continue gathering sensor data when the network strength level is low because gathering sensing sensor data is a low risk capability. For another example, local navigation control can be executed by a robot when the network strength level is low. Local navigation control occurs when a remote operator sends a destination to a robot, and the robot determines how to travel to the destination (as opposed to the remote operator directly controlling the robot's maneuvers to the destination). Because local navigation control is not a network sensitive capability, local navigation control can be executed when the network strength level is low.

In order to determine whether capabilities of a robot should be enabled or disabled, the robot may measure a network strength level for a network that the robot uses to communicate data with a remote control system. The robot may measure network strength based on network latency or a packet loss rate. The network strength is measured by the robot to ensure authenticity of the network strength data. In particular, network strength is measured by the robot to avoid a human operator misrepresenting the network strength. An accurate network strength measurement encourages high precision, high-risk, and/or network sensitive capabilities to be disabled at appropriate times.

The robot may use a modified token to measure cumulative round-trip time for a robot to send and receive a message. For example, the robot may generate a unique token for each outgoing packet. Control commands from the human operator would then be transmitted with the received token by the human operator to the robot. When the robot receives the control commands, the received tokens could then be used to measure round-trip network delay and packet loss. The robot may generate a token based on a cryptographic hash of a timestamp for an outgoing packet and a secret key only known by the robot. As a result, the token may be only 4-8 bytes. Thus, the tokens may not require a large amount of network bandwidth. In some embodiments, the token from the robot may be authenticated or "signed" by the human operator.

The robot may provide several features for disabled capabilities. These features include a failsafe operation mode and human operator overrides. When a high risk, high precision, or network sensitive capability is being executed (e.g., precision robot arm control), a failsafe operation mode may be helpful if the network strength decreases during performance of the capability. For example, if a robot is performing precision robot arm control, and the network strength suddenly decreases, incorrect commands for the robot arm due to the poor network connection may cause safety problems. However, a failsafe operation mode may mitigate potential safety problems caused by the degraded network during high precision arm control. For example, a failsafe operation mode may cause an extended robot arm to be retracted back towards the robot to prevent safety problems from a poor network connection. Alternatively, a human operator may configure a failsafe operation mode for certain high precision, high-risk, or network sensitive capabilities.

Operator overrides may be used when a decrease in the network strength causes a capability to be disabled. In particular, an operator override may allow a human operator to execute a task that has been disabled due to a decrease in network strength. In some embodiments, a robot may permit operator overrides for some capabilities (e.g., navigation control), whereas a robot may deny operator overrides for other capabilities (e.g., precision arm control) due to the riskiness, precision, and/or network sensitivity of the capability.

The robot may also communicate data to the human operator. For example, the robot may provide the measured network strength and an indication of capabilities that are available and/or unavailable due to the network strength by way of a user interface for the human operator. The user interface may be color-coded to better indicate which capabilities are available or unavailable due to the network strength. For example, available capabilities may be listed in a green background while unavailable capabilities may be displayed with a red background.

The robot may also provide an indication of changed operations. In particular, when an operation is disabled or enabled due to a change in the network strength (e.g., high precision arm control is disabled due to a decrease in network strength), the robot may provide an indication of this event to the user. In one embodiment, a user interface displays a notification that the network strength has changed along with any capabilities that have been disabled or enabled due to the network strength change. In some embodiments, an audible indication, such as a buzzer or an alarm, may be provided to a human operator when the capability is disabled due to a decrease in network strength.

In some embodiments, a user interface may display a notification warning the remote operator that the network strength is weakening and may cause an operation to become disabled in the near future. In this case, the user interface is providing a warning to the remote operator to pause or complete their operation before the weakened network strength disables the operation. In some embodiments, an audible indication, such as a buzzer or an alarm, may be provided to warn a human operator to pause or complete an operation before the operation is disabled due to a weakening network strength.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
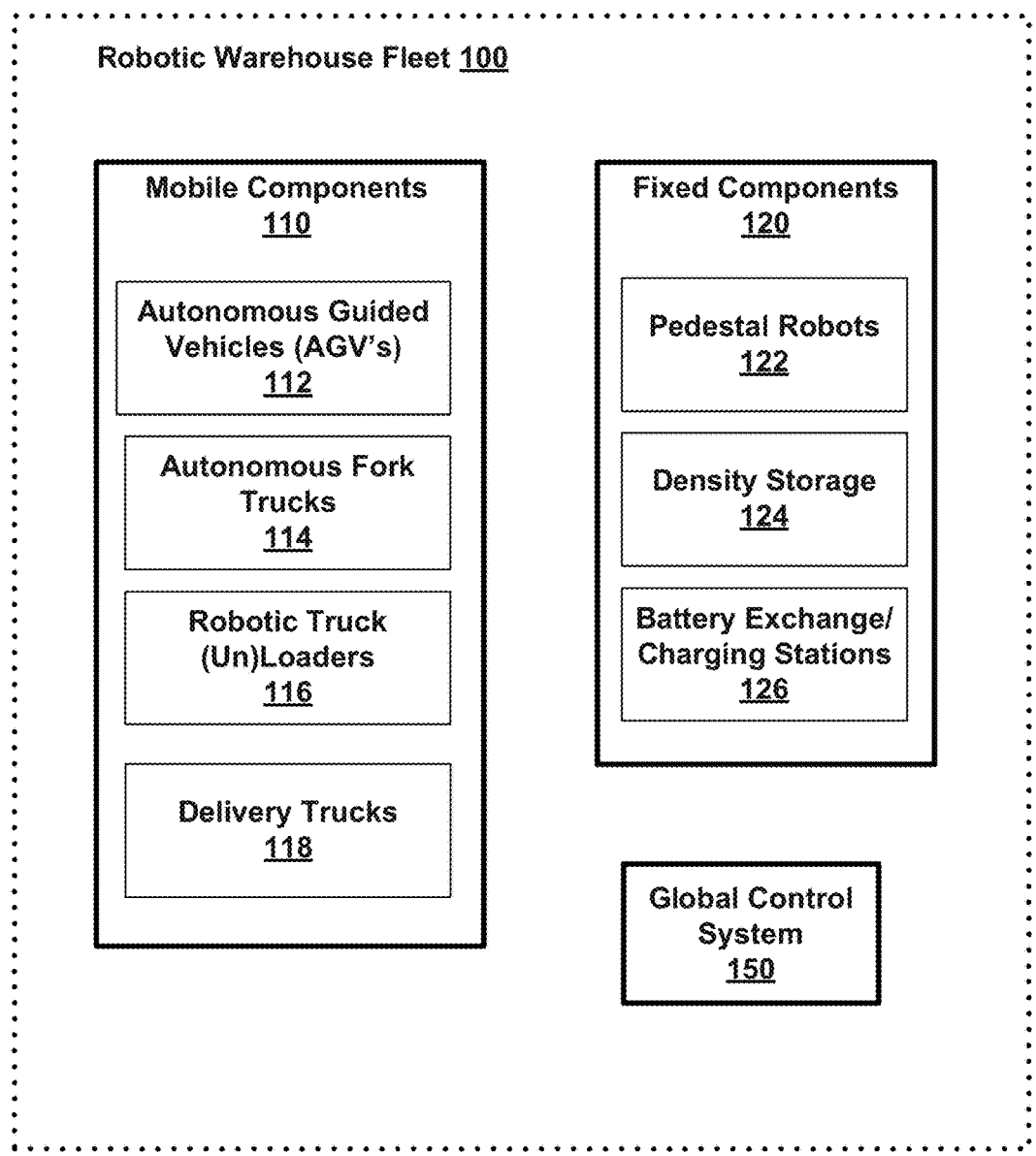
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
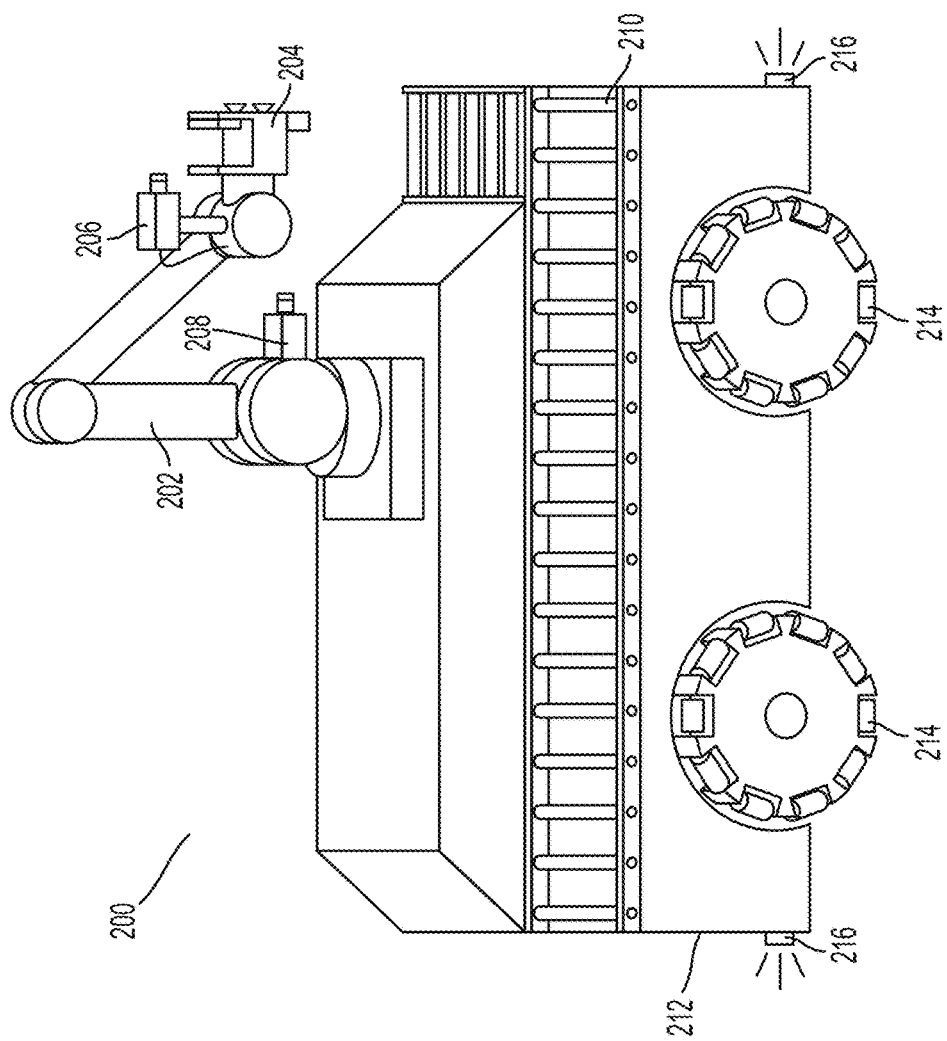
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
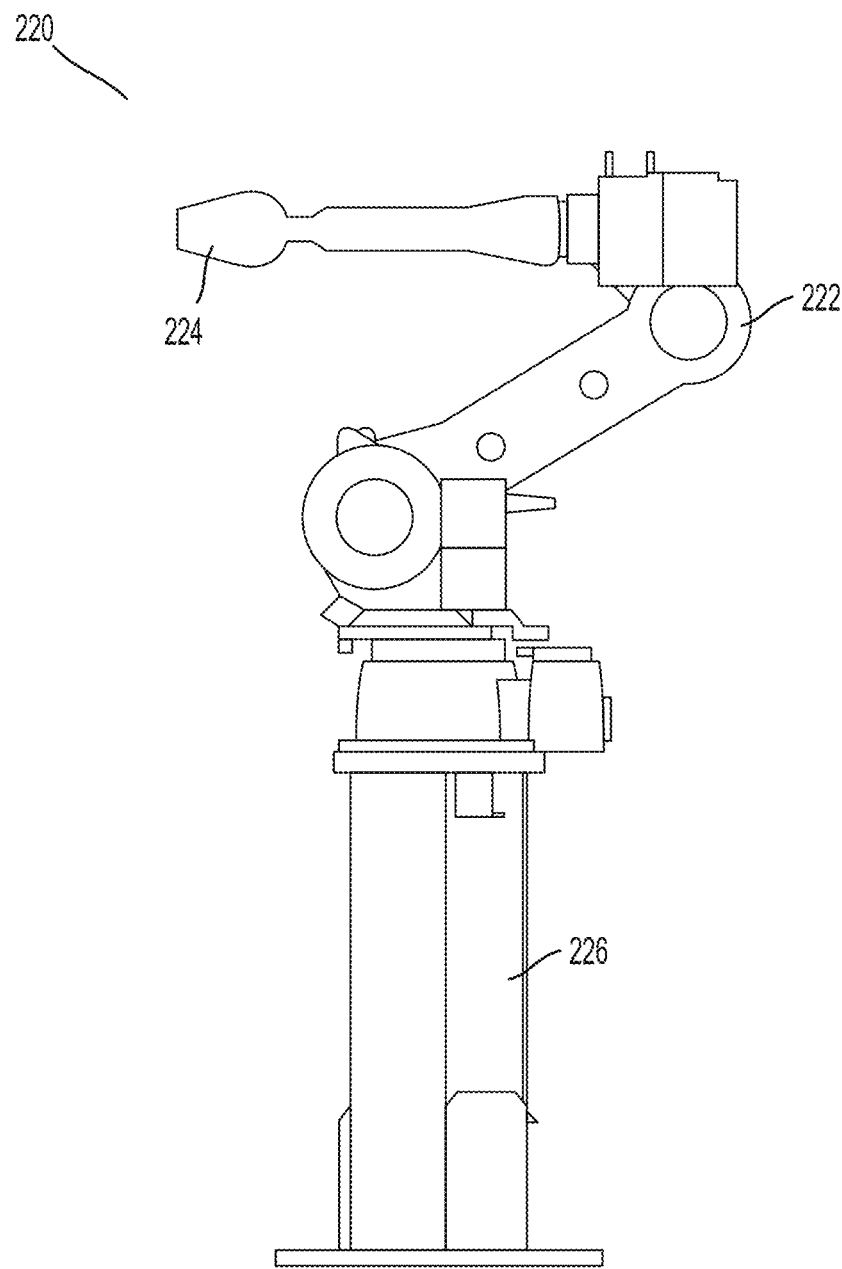
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
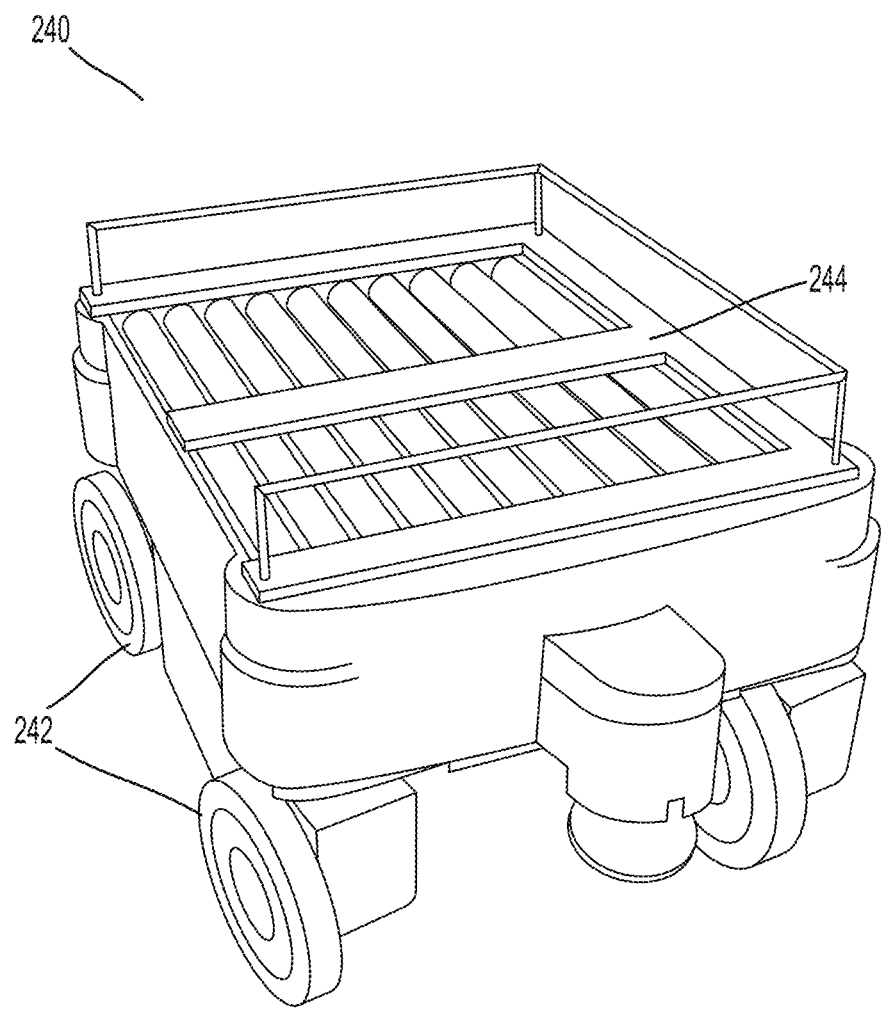
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
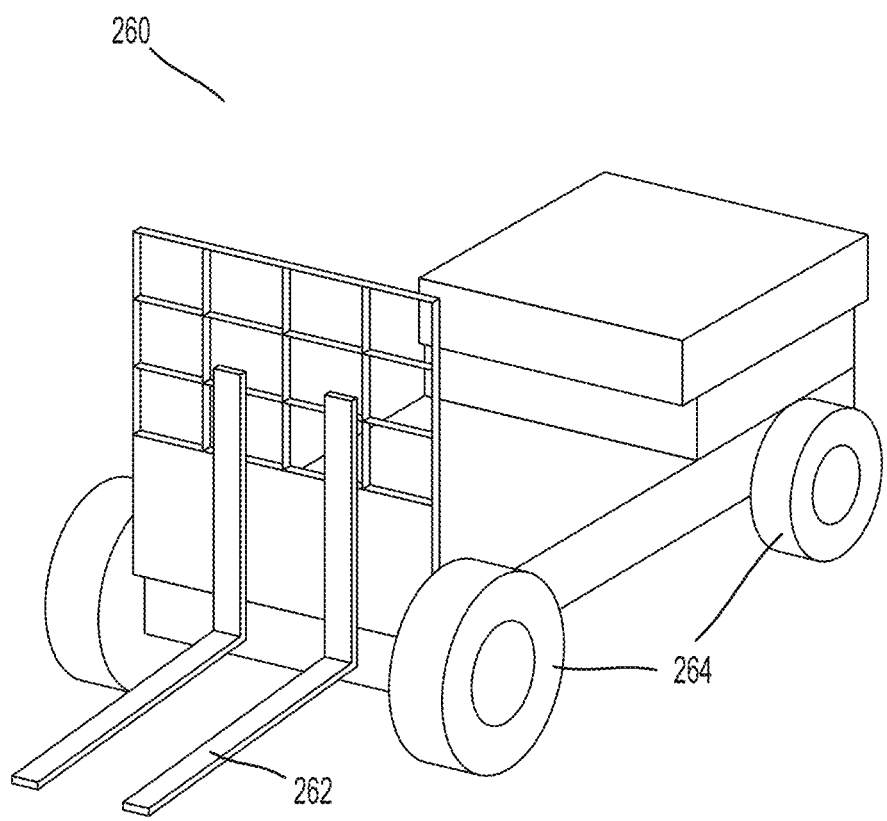
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
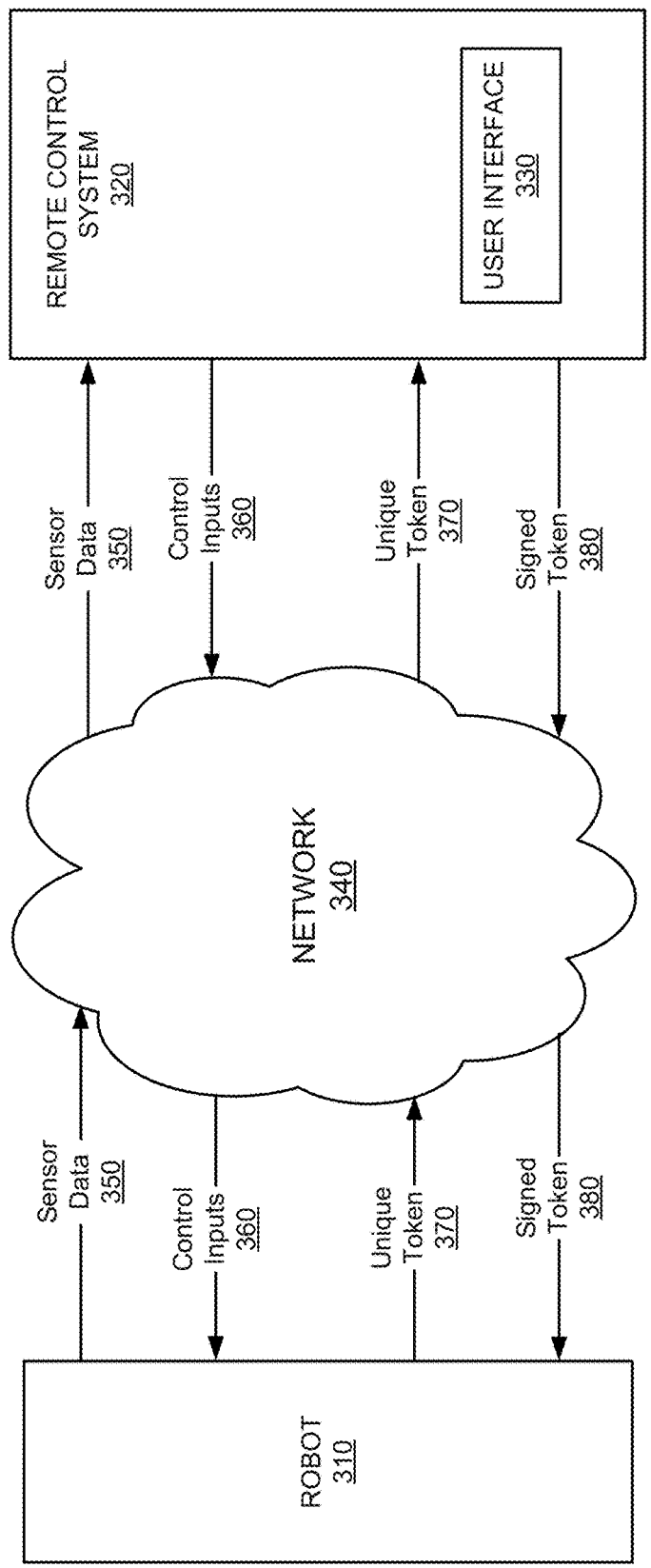
FIG. 3 illustrates an example network diagram of a robot and a remote control system, according to an example embodiment.

FIG. 3 displays an example network diagram for a robot communicating with a remote control system over a network. More specifically, FIG. 3 includes a robot 310 that communicates with a remote control system 320 via a network 340. The robot may be any one of the warehouse robots described in FIGS. 1A-1B and/or FIGS. 2A-2D (e.g., AGVs 112, autonomous fork truck 114, robotic truck loader 116, pedestal robot 122, etc.). Alternatively, the robot may be a robot different from those described in reference to FIGS. 1A-1B and/or 2A-2D.

The remote control system 320 may be part of, or the same as, global control system 150. Alternatively, the remote control system 320 may be a separate control system from global control system 150. The remote control system 320 may be a remote, cloud-based server system that enables teleoperation of robot 310 by a human operator. System 320 may provide a user interface 330 for a remote human operator. System 320 may include one or more computing devices. In some embodiments, the remote control system 320 is located at the same location (e.g., the warehouse) as the robot 310. In other embodiments, the remote control system 320 is located at a remote location from the robot 310.

Network 340 may include a plurality of networks to support a network communication link between robot 310 and remote control system 320. The network 340 may be a wired network, a wireless network, or a combination of wireless and wired networks. For example, network 340 may be a wireless network at a warehouse, where both the robot 310 and the remote control system 320 are located. Alternatively, network 340 may be a combination of one or more wide area networks, local area networks, and/or wireless networks to enable robot 310 at a warehouse to communicate with remote control system 320 at a remote facility. The network 340 may rely on one or more computing devices to enable communication between robot 310 and the remote control system 320. Other configurations of network 340 are also possible.

Robot 310 can communicate with remote control system 320 by way of the network 340. In particular, robot 310 can send information, such as sensor data 350, to remote control system 320 by way of the network 340. Additionally, remote control system 320 can send information, such as control inputs 360, to robot 310. The control inputs may affect the operations of the robot 310. For example, remote control system 320 may send control inputs 360 regarding a particular operation for the robot 310. Specifically, the remote control system 320 may send a control input 360 of a destination to robot 310 for destination-based navigation. The control inputs 360 may be determined by system 320 based on sensor data 350 received from robot 310. In other embodiments, robot 310 and remote control system 320 may exchange different information than the information shown or described for FIG. 3.

Robot 310 also measures the network strength of the communication network 340 relied upon by robot 310 and remote control system 320 for communication. In particular, robot 310 measures the strength of the network link used by robot 310 and remote control system 320 to exchange information (e.g., sensor data 350, control inputs 360, tokens 370 and 380). The measured network strength is used to determine whether one or more of the operations of the robot should be enabled. Thus, an accurate network strength may encourage safer and more efficient operation of the robot by enabling and disabling capabilities.

The network strength may be measured based on network latency or a packet loss rate. Network latency indicates the round-trip delay time present when transmitting a packet from robot 310 to remote control system 320 and then back to robot 310. Round-trip time may be a better measure for network latency for robot 310 than one-way latency because some of the robot operations (e.g., robot arm control) require both control inputs 360 and control feedback (e.g., sensor data 350) for effective operation. Packet loss rate indicates the percentage of packets sent from a source (e.g., robot 310, remote control system 320) that are lost. A packet may be considered lost if it fails to reach its destination (e.g., remote control system 320, robot 310). In other embodiments, other metrics are used to measure network strength.

The network strength may be measured by robot 310 to ensure authenticity of the measured network strength. In particular, by measuring network strength at the robot 310, a user of the remote control system 320 is prevented from misrepresenting the network strength (e.g., by providing a false network latency value or packet loss rate value) to the robot 310 and/or remote control system 320. Thus, measuring network strength at the robot further encourages an accurate measure of network strength.

The robot 320 may measure the network strength by sending a first message with a unique token 370 to the remote control system 320 by way of the network 340. The unique token 370 may be generated at the robot 310. Once the remote control system 320 receives the first message with the unique token 370, the system 320 may then authenticate the received token. The remote control system 320 may then send a second message including a "signed" token 380 (i.e., authenticated token) to the robot 310 by way of the network 340. Once robot 310 receives a second message with the signed token 380, robot 310 may then verify the signed token 380. After verification, robot 310 can then use the messages with tokens 370 and 380 to help determine the network strength. In particular, the robot 310 may determine the network latency based on the messages with tokens 370 and 380.

The unique token 370 may include an encrypted timestamp or an identifier. The encrypted timestamp or identifier may include a cryptographic hash. However, in other embodiments, a different type of token may be used. The unique token 370 may only require 4-8 bytes, in some embodiments. Thus, the unique token 370 may be added to packets already being transmitted, such as packets for sensor data 350. Similarly, the signed token 380 may also be added to packets already being sent, such as packets for control inputs 360. By adding tokens to packets that are already being transmitted, the robot 310 can determine network strength without adding a large amount of throughput. Alternatively, the tokens 370 and/or 380 may be sent in separate packets.

Figure 4:
FIG. 4 illustrates exemplary tiers of operations for a robot, according to an example embodiment.

FIG. 4 displays exemplary tiers of operations that can be performed by a robot. FIG. 4 includes table 400, which displays four tiers of operations. Each tier may be associated with one or more operations performed by the robot. Additionally, each tier may be enabled or disabled depending on the network strength. As a result, each tier may be associated with a network strength threshold that indicates the minimum network strength required for a tier of operations to be enabled. Thus, if the network strength is below the network strength threshold for a tier of operations, then the corresponding tier of operations may be disabled due to low network strength.

A network strength threshold can be expressed as a network latency or a packet loss rate. Network strength is inversely related to both network latency and packet loss rate. Thus, a lower network latency or packet loss rate indicates a higher network strength. Therefore, the network latency and packet loss rate values of table 400 indicate the maximum permissible values for a tier of operations to remain enabled.

For example, if a network latency is below 50 ms, then the operations for tiers 1, 2, 3, and 4 are all enabled. However, if the network latency rises to 70 ms, then the network strength has dropped below the network strength threshold of tier 1 (i.e., network latency of 50 ms). As a result, tier 1 operations are disabled, while operations for tiers 2, 3, and 4 remain enabled.

As shown by table 400, tier 1 has the highest network strength threshold, with each subsequent tier having a lower network strength threshold. Thus, tier 4 has the lowest network strength threshold with a network latency of one second and a packet loss rate of 10%. Operations are assigned to tiers based on the network sensitivity, riskiness, and precision required for the operation. In particular, operations with a higher network sensitivity, higher riskiness, and/or higher precision are assigned to tiers requiring a higher network strength. In some examples, one or more tiers of operations may always be enabled (e.g., have a network strength threshold of 0).

Network strength can influence the effectiveness of robot operations. In particular, longer time delays for sensor data and/or control inputs may inhibit control of systems (e.g., robots). Poor network strength can cause long time delays for sensor data and/or control inputs. Thus, a high network strength is beneficial for robot operations that require timely sensor data and/or control inputs for safe and effective operation.

Robot operations that are high precision, high-risk, or network sensitive may be assigned to tiers of operations with high network strength (e.g., tier 1) because the operations require timely sensor data and control inputs. Specifically, high precision manipulation of a system requires accurate input data, such as sensor data, to generate accurate control outputs, such as control inputs for a robot. As for high risk operations, ineffective execution of these operations may be dangerous. Thus, high-risk operations may also be assigned to a tier with a high network strength threshold. Also, operations that are network sensitive may be ineffective if network strength is low. Thus, high precision, high-risk, and network sensitive operations may be assigned to tiers with a high network strength threshold.

If the network strength falls below the network strength threshold for a tier of operations, several responses to the changed network strength can occur. First, as mentioned earlier, operations associated with the tier may be disabled due to low network strength. An alternative response to disabling operations may be to execute operations more slowly. For example, for destination-based navigation control in tier 3, if the network strength drops below the network strength threshold of tier 3, then the response may be to impose a lower velocity limit on the robot due to the reduced network strength. For another example, a robot arm may be controlled to move from one position to another position at a slower rate due to a reduced network strength.

Another response to reduced network strength may be for the operation to enter a failsafe mode. For example, if a robot is enabled to do destination-based navigation control for tier 3, and the network strength drops below the network strength threshold for tier 3, the robot may enter a failsafe mode. During failsafe mode, the robot may locally control the destination-based navigation control. Thus, in some embodiments, the robot may continue executing the destination-based navigation control during failsafe mode. In some embodiments, the navigation may be executed at a slower speed during failsafe mode. Alternatively, failsafe mode may cause the robot to disable the destination-based navigation control operation and remain stationary until the network strength increases above the network strength threshold for tier 3. For another alternative, failsafe mode may cause the robot to disable the destination-based navigation control operation and return to the beginning point of the navigation. Other failsafe modes for other operations are also possible.

Yet another response to reduced network strength may be to increase the frequency of network strength measurements by a robot. In particular, frequent measurement of network strength by a robot may lead to a more accurate measurement of network latency. As a result, the robot would obtain a more accurate network strength measurement, which would enhance decision-making about which tiers of operations to enable or disable. However, increased network strength measurement frequency may cause the use of more throughput, which may be detrimental for network strength.

Table 400 displays example operations associated with each of four tiers. In particular, tier 1 includes operations associated with robot arm control. Tier 1 may include one or more operations that are high risk, high precision, and/or network sensitive. Example operations assigned to tier 1 may include robot arm control, the robot picking up and/or setting down an object, and/or the robot loading and/or unloading a vehicle, such as a pallet jack or a truck. Other robot operations may also be assigned to tier 1.

Robot arm control may be assigned to tier 1 because it is a high precision operation. Thus, in order for robot arm control to be effective, the remote control system may rely on timely received sensor data to determine and send accurate control inputs to the robot. As a result, a tier with a high network strength threshold, such as tier 1, may be the appropriate tier for robot arm control. Loading and unloading a vehicle may be assigned to tier 1 because the operation is high risk. For example, if the robot is carrying a box that is heavy or contains hazardous material, a failure by the robot to load or unload the box properly may cause problems due to the contents of the box. Thus, a tier with a high network threshold may be appropriate for this operation to prevent a failure arising from low network strength.

In table 400, tier 2 operations include manual navigation control. For manual navigation control, the remote control system sends commands to the robot indicating where the robot should go. The remote control system may also control the speed of the robot. Operations assigned to tier 2 may be less risky, less precise, and less network sensitive than tier 1 operations. However, tier 2 operations may still be more risky, precise, and network sensitive than tier 3 and tier 4 operations.

In table 400, tier 3 operations include destination-based navigation control. Unlike manual navigation control, the remote control system sends the target destination to the robot. The robot then determines how to navigate from its current location to the target destination. As a result, if the network strength is low, the robot may still complete destination-based navigation control because the robot determines how to navigation to a given destination locally. Thus, destination-based navigation control is assigned to tier 3 because this type of navigation control is less network sensitive than manual navigation control.

Table 400 includes gathering sensor data as a tier 4 operation. In general, operations assigned to tier 4 are the least risky, precise, and network sensitive operations performed by the robot. For example, the operation of gathering sensor data is assigned to tier 4 because a robot may execute this operation locally. Another tier 4 operation may be the use of visual sensors by a pedestal robot 220 to identify boxes. Other low risk, low precision, network insensitive operations may also be assigned to tier 4.

In some embodiments, the remote control system 320 of FIG. 3 may plan to schedule tiers of operations based on a schedule indicating network strength. As a result, operations for high network strength tiers, such as tier 1, may be scheduled during times where network strength is high. Further, the remote control system 320 may schedule one or more operations from tier 4 at times where one or more other tiers of operations are disabled because tier 4 operations have a low network strength threshold.

Figure 5:
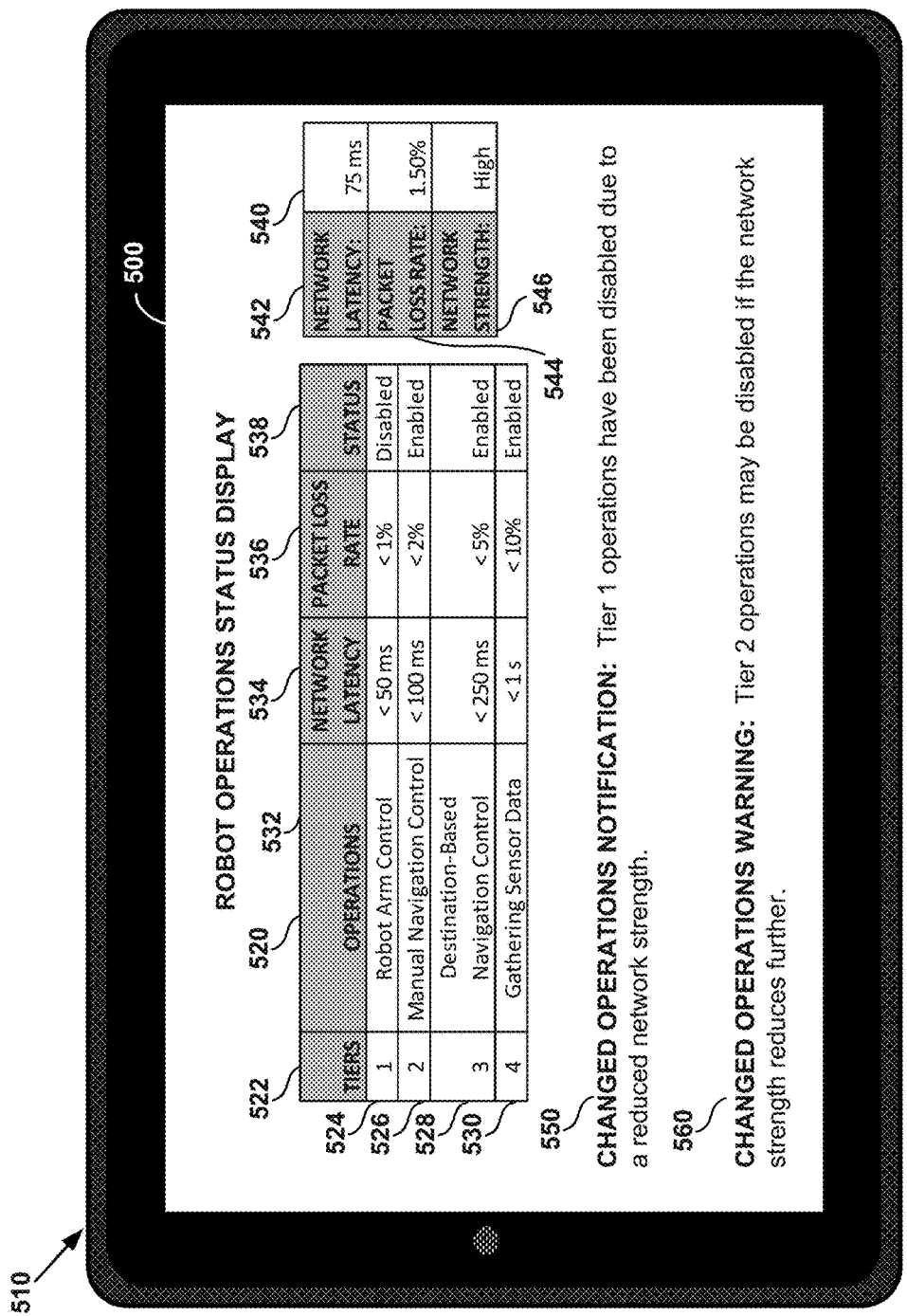
FIG. 5 illustrates an example user interface of a remote control system, according to an example embodiment.

FIG. 5 displays an example user interface of a remote control system that communicates with one or more robots. User interface 500 may be accessed on a remote device 510 by an operator. The remote device 510 could be a computing device, such as a computer, a personal computer, laptop, desktop, tablet, PDA, cellular telephone, smartwatch, smart phone, wearable computing device, and/or some other computing device. The user interface 500 may include an operation status table 520, a network strength table 540, a changed operation's notification 550, and/or a changed operation's warning 560. In other embodiments, the user interface 500 may include more, fewer, and/or different components than those displayed in FIG. 5.

The table 520 may include the tiers of operations associated with a robot. Table 520 may include one or more rows for each tier of operations. In the displayed embodiment, table 520 includes rows 524, 526, 528, and 530 for the four different tiers 522 of operations for a robot. For each tier, the table 520 includes various columns of information. The information for each tier 522 includes operations 532, an associated network latency 534, an associated packet loss rate 536, and a status 538. Table 520 also displays the current measured network latency 542, the current measured packet loss rate 544, and the current measured network strength 546. In some embodiments, table 520 can display more, less, and/or different information and the information shown in FIG. 5.

The rows of table 520 (e.g., rows 524, 526, 528, and/or 530) may be color-coded to indicate whether a tier of operations is disabled, enabled, or in danger of being disabled. For example, row 524 for tier 1 operations may have a background color of red to indicate that tier 1 operations have been disabled due to the network strength being too low. For another example, rows 528 and 530 may have a background color of green to indicate that tier 3 operations and tier 4 operations are enabled due to a high network strength. For an additional example, row 526 may have a background color of yellow to indicate that tier 2 operations may be the next tier of operations disabled if the network strength decreases further. In other embodiments, the user interface may not be color-coded based on the status of the operations. In some embodiments, the table 520 may be color-coded with different colors and those described for FIG. 5.

User interface 500 also displays network strength table 540. Table 540 includes a current measurement of network latency 542, a current measurement of packet loss rate 544, and a determined network strength 546. The network latency 542 and packet loss rate 544 may be measured by robot 310 and provided to remote control system 320 as described in reference to FIG. 3 for display on user interface 500. The network strength 546 may be determined based on the network latency 542 and/or the packet loss rate 544. In the displayed embodiment, the network strength 546 may have four different levels, with each level being associated with a tier of operations that are enabled.

For example, tier 1 operations may correspond to a network strength 546 of "very high," tier 2 operations may correspond to a network strength 546 of "high," tier 3 operations may correspond to a network strength 546 of "medium," and tier 4 operations may correspond to a network strength 546 of "low." Thus, for table 540, the network strength 546 is "high" because the network latency 542 of "75 ms" is less than the tier 2 operations network latency threshold of "100 ms" and larger than the tier 1 operations network latency threshold of "50 ms." Similarly, the packet loss rate 544 of "1.50%" is less than the tier 2 operations packet loss rate threshold of "2%" and greater than the tier 1 operations packet loss rate threshold of "1%." Thus, the current network latency 542 and packet loss rate 544 result in a network strength 546 of "high."

User interface 500 also includes changed operations notification 550. In the displayed embodiment, notification 550 indicates that tier 1 operations have been disabled due to a reduced network strength. However, in other embodiments, notification 550 can indicate tiers of operations that have been enabled due to a network strength increase. Additionally, notification 550 can indicate whether multiple tiers of operations have been enabled or disabled due to a change in network strength.

User interface 500 also includes changed operations warning 560. In the displayed embodiment, warning 560 indicates that tier 2 operations may be disabled if the network strength decreases further. Thus, warning 560 may indicate to a remote human operator to either pause or complete tier 2 operations, in case they become disabled due to reduced network strength. However, in other embodiments, warning 560 can indicate tiers of operations that may be enabled due to a network strength increase. Additionally, warning 560 can indicate whether multiple tiers of operations may be enabled or disabled due to a change in network strength.

The user interface 500 may also provide features that are not displayed in FIG. 5. First, the user interface 500 may allow a remote human operator to configure a failsafe mode for one or more operations of a robot. For example, if tier 3 operations are disabled, then the destination-based navigation control operation of tier 3 may also be disabled and enter a failsafe mode. The failsafe mode for destination-based navigation control of the robot may have different options, including continuing navigation to the specified destination, continuing navigation to the specified destination at a slower velocity, stopping navigation and remaining stationary, stopping navigation and returning to the starting point. The user interface 500 may allow a remote human operator to configure the failsafe mode operation by selecting one of the aforementioned options.

Second, the user interface 500 may allow a remote human operator to override disabled tiers of operations. For example, if tier 3 operations are disabled, the user interface 500 may permit a remote human operator to override the tier 3 disabling by enabling a tier 3 operation, such as destination-based navigation control. In some embodiments, the user interface 500 may allow a remote human operator to override some tiers of operations (e.g., tier 3) but not other tiers of operations (e.g., tier 1) due to concerns about high risk, high precision, and/or high network sensitivity of the disabled operations.

Third, the user interface 500 may provide audible indications, such as alarms or buzzers, for certain events. For example, changed operation notification 550 may be accompanied by an alarm, buzzer, or some other audible indication when a tier of operations has been disabled or enabled due to a change in network strength. For another example, changed operations warning 560 may also be accompanied by an alarm, buzzer, or some other audible indication when a tier of operations may be disabled if the network strength is further reduced.

Figure 6:
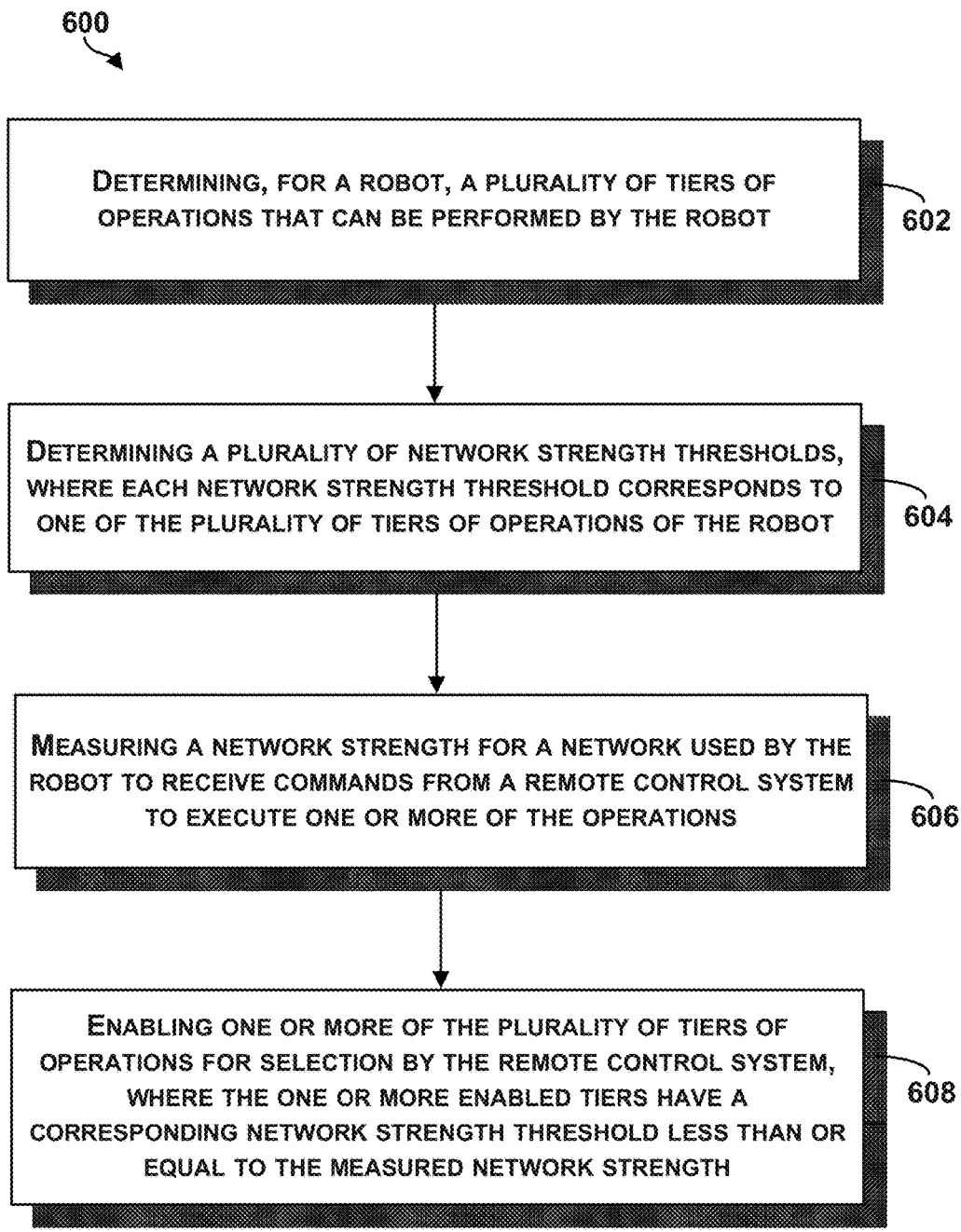
FIG. 6 is a block diagram of a method, according to an example embodiment.

FIG. 6 illustrates a flowchart showing a method 600 that may allow for enabling or disabling capabilities of a robot based on a measured network strength, according to an example embodiment. Method 600 may be carried out with one or more robots of a robotic fleet, such as illustrated and described with respect to FIGS. 1A-1B. In some examples, method 600 may be executed by one or more of the robots (mobile components or fixed components) of the robotic fleet described with respect to FIG. 1B. The method 600 may involve the use of one or more of the different types of robotic devices illustrated and described in FIGS. 2A, 2B. 2C, and 2D, as well as other types of robotic devices not specifically described.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 6. Where used, program code can be stored on any type of computer-readable medium, for example, such as a storage device including a disk or hard drive.

In addition, each block of the flowchart shown in FIG. 6 may represent circuitry that is wired to perform the specific logical functions in the process. Unless specifically indicated, functions in the flowchart shown in FIG. 6 may be executed out of order from that shown or discussed, including substantially concurrent execution of separately described functions, or even in reverse order in some examples, depending on the functionality involved, so long as the overall functionality of the described method is maintained.

As shown by block 602 of FIG. 6, method 600 may involve determining, for a robot, a plurality of tiers of operations that can be performed by the robot. In some examples, a robot may determine as many as four different tiers of operations, as shown in FIG. 4 by table 400. In additional examples, a robot may determine more or less than four tiers of operations that are performed based on the network strength. In further examples, a robot may determine more operations, fewer operations, or different operations than the operations displayed in table 400 of FIG. 4.

Method 600 may further involve determining a plurality of network strength thresholds, wherein each network strength threshold corresponds to one of the plurality of tiers of operations of the robot, as shown by block 604. In some examples, a robot may determine network strength thresholds based on a network latency and/or a packet loss rate, as shown in table 400 of FIG. 4. In further examples, a robot may determine network strength thresholds based on criteria different from network latency or a packet loss rate. In further examples, a robot may determine network strength threshold values that are larger or smaller than the network strength thresholds displayed in table 400 of FIG. 4.

Method 600 may also involve measuring a network strength for a network used by the robot to receive commands from a remote control system to execute one or more of the operations, as shown by block 606. In some examples, the network strength may be measured by the robot to ensure authenticity of the measured network strength. In additional examples, the network strength may be measured by the robot sending a message including a token to a remote control system, followed by the robot receiving a second message including a signed token from the remote control system, followed by the robot verifying the received token and measuring the network strength. In further examples, the robot may rely on an encrypted timestamp within the token to measure the network strength.

Method 600 may additionally involve enabling one or more of the plurality of tiers of operations for selection by the remote control system, wherein the one or more enabled tiers have a corresponding network strength threshold less than or equal to the measured network strength, as shown by block 608. In some examples, all of the tiers of operations may be enabled when the network strength is at its strongest level. In additional examples, none of the tiers of operations may be enabled when the network strength is at its weakest level. In further examples, some, but not all of the tiers, may be enabled when the network strength is at an intermediate level. Additionally, one or more tiers of operations may be also enabled when the network strength increases.

While the disclosed system and methods have been described in the context of a warehouse application and environment, other applications and environments are also possible for the disclosed system and methods. For example, other environments where adjusting robot operations based on network connectivity may be applicable include manufacturing facilities, mailing or shipping facilities, airports, hospitals, or other environments. Furthermore, other applications where adjusting robot operations based on network connectivity may be applicable include construction, shipping, manufacturing, healthcare, and/or other applications. Other applicable environments and applications for the disclosed system and methods may also be possible.

For example, the disclosed system and methods may be applied to adjusting robot operations for robots in a manufacturing plant based on network connectivity between the robots and a remote control system. Similar to FIG. 3, the remote control system may receive sensor data from the robots and send control inputs to the robots by way of a communication network. A particular robot may have multiple capabilities organized into various tiers of operations, similar to FIG. 4. Similar to FIG. 4, the particular robot may have tier 4 operations including gathering sensor data, tier 3 operations including destination-based navigation control, and tier 2 operations including manual navigation control. For a manufacturing application, the particular robot may be able to pick up, transport, and/or operate one or more tools for manufacturing. The operations of picking up and/or operating a tool may be categorized as a tier 1 operation for the particular robot.

For the particular robot, one or more tiers of operations may be enabled or disabled based on the network strength of the network link connecting the particular robot to the remote control system. The four tiers of operations for the particular robot may have network strength thresholds similar to the four tiers of operations displayed in FIG. 4. In particular, tier 1 operations of the particular robot may have the highest network strength threshold. Tier 4 operations may have the lowest network strength threshold. Tier 3 operations may have a higher network strength threshold than tier 4, but a lower network strength threshold than tier 2. Similarly, the network strength threshold of tier 2 may be higher than the threshold for tier 3, but lower than the threshold for tier 1.

Based on the network strength thresholds of the tiers of operation, high-risk or high precision operations, such as operating the tool or picking up the tool, may require the highest network strength. Meanwhile, low risk or low precision operations, such as gathering sensor data, may be executed despite weak network strength. Similar to FIG. 5, a user interface for the manufacturing application may display which tiers of operations are enabled or disabled. Furthermore, the user interface may provide a notification for tiers of operations that have recently been disabled. Even further, the user interface may provide a warning for tiers of operations that may be disabled if the network strength continues to weaken. Other features of the user interface may also be applicable to adjusting robot operations based on network strength for the manufacturing application. Other applications and environments are possible for the disclosed system and methods.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
providing, for display on a user interface of a remote control system for a robot, a plurality of tiers of operations that can be performed by the robot;
determining a plurality of network strength thresholds, wherein each network strength threshold corresponds to one of the plurality of tiers of operations of the robot;
measuring a network strength for a network used by the robot to receive commands from the remote control system to execute one or more of the operations;
enabling one or more of the plurality of tiers of operations for selection by the remote control system, wherein the one or more enabled tiers of operations have a corresponding network strength threshold less than or equal to the measured network strength; and
providing, for display on the user interface of the remote control system for the robot, an indication of the one or more enabled tiers of operations.

2. The method of claim 1, wherein the network strength is measured at the robot.

3. The method of claim 2, wherein measuring the network strength comprises:
sending a first message from the robot to the remote control system, wherein the message includes an encrypted timestamp;
receiving, by the robot, a second message from the remote control system including the encrypted timestamp; and
determining, by the robot, the network strength based on the encrypted timestamp from the received second message.

4. The method of claim 3, wherein measuring the network strength further comprises:
determining a network latency based on the encrypted timestamp in the received second message; and
determining the network strength based on the network latency.

5. The method of claim 1, wherein measuring the network strength further comprises:
determining a packet loss rate; and
determining the network strength based on the packet loss rate.

6. The method of claim 1, further comprising:
determining that the network strength has decreased; and
disabling an enabled tier of operations due to the decreased network strength.

7. The method of claim 6, wherein at least one operation in the disabled tier of operations reverts to a fail-safe operation mode for the robot.

8. The method of claim 6, further comprising:
provoking a notification to the remote control system indicating the disabling of the previously enabled tier of operations due to the decreased network strength; and
providing a signal to the remote control system identifying a currently enabled tier of operations that will be disabled if the network strength decreases below the network strength threshold corresponding to the currently enabled tier of operations, wherein the signal indicates to pause or complete operations within the currently enabled tier of operations.

9. The method of claim 1, further comprising:
providing an indication of the measured network strength by way of the user interface of the remote control system.

10. The method of claim 1, wherein a higher network strength threshold is assigned to a first tier of operations than to a second tier of operations, wherein the first tier of operations has a higher network sensitivity than the second tier of operations.

11. The method of claim 10, wherein the first tier of operations includes robot arm control, wherein the second tier of operations includes gathering robot sensor data.

12. A non-transitory computer-readable medium storing instructions that are executable by one or more computing devices associated with a robot, wherein executing the instructions causes the one or more computing devices to perform functions comprising:
providing, for display on a user interface of a remote control system for the robot, a plurality of tiers of operations that can be performed by the robot;
determining a plurality of network strength thresholds, wherein each network strength threshold corresponds to one of the plurality of tiers of operations of the robot;
measuring a network strength for a network used by the robot to receive commands from the remote control system to execute one or more of the operations;
enabling one or more of the plurality of tiers of operations for selection by the remote control system, wherein the one or more enabled tiers of operations have a corresponding network strength threshold less than or equal to the measured network strength; and
providing, for display on the user interface of the remote control system for the robot, an indication of the one or more enabled tiers of operations.

13. The non-transitory computer-readable medium of claim 12, wherein the network strength is measured at the robot, wherein measuring the network strength comprises:
sending a first message from the robot to the remote control system, wherein the message includes an encrypted timestamp;
receiving, by the robot, a second message from the remote control system including the encrypted timestamp; and
determining, by the robot, the network strength based on the encrypted timestamp from the received second message.

14. The non-transitory computer-readable medium of claim 12, further comprising:
determining that the network strength has decreased;
disabling an enabled tier of operations due to the decreased network strength;
providing a notification to the remote control system indicating the disabling of the previously enabled tier of operations due to the decreased network strength; and
providing a signal to the remote control system identifying a currently enabled tier of operations that will be disabled if the network strength decreases below the network strength threshold corresponding to the currently enabled tier of operations, wherein the signal indicates to pause or complete operations within the currently enabled tier of operations.

15. The non-transitory computer-readable medium of claim 12, wherein a higher network strength threshold is assigned to a first tier of operations than to a second tier of operations, wherein the first tier of operations has a higher network sensitivity than the second tier of operations.

16. The non-transitory computer-readable medium of claim 15, wherein the first tier of operations includes manual navigation control of the robot, wherein the second tier includes destination-based navigation control of the robot.

17. A robot comprising:
a processor; and
a memory storing instructions that when executed by the processor cause the robot to perform functions comprising:
providing, for display on a user interface of a remote control system for the robot, a plurality of tiers of operations that can be performed by the robot;
determining a plurality of network strength thresholds, wherein each network strength threshold corresponds to one of the plurality of tiers of operations of the robot;
measuring a network strength for a network used by the robot to receive commands from the remote control system to execute one or more of the operations;
enabling one or more of the plurality of tiers of operations for selection by the remote control system, wherein the one or more enabled tiers of operations have a corresponding network strength threshold less than or equal to the measured network strength; and
providing, for display on the user interface of the remote control system for the robot, an indication of the one or more enabled tiers of operations.

18. The robot of claim 17, wherein the instructions for measuring the network strength further cause the robot to perform functions comprising:
sending a first message from the robot to the remote control system, wherein the message includes an encrypted timestamp;
receiving, by the robot, a second message from the remote control system including the encrypted timestamp; and
determining, by the robot, the network strength based on the encrypted timestamp from the received second message.

19. The robot of claim 17, wherein the instructions further cause the robot to perform functions comprising:
determining that the network strength has decreased;
disabling an enabled tier of operations due to the decreased network strength;
providing a notification to the remote control system indicating the disabling of the previously enabled tier of operations due to the decreased network strength; and
providing a signal to the remote control system identifying a currently enabled tier of operations that will be disabled if the network strength decreases below the network strength threshold corresponding to the currently enabled tier of operations, wherein the signal indicates to pause or complete operations within the currently enabled tier of operations.

20. The robot of claim 17, wherein a higher network strength threshold is assigned to a first tier of operations than to a second tier of operations, wherein the first tier of operations has a higher network sensitivity than the second tier of operations.

* * * * *